United States Patent
Baquet et al.

(10) Patent No.: US 10,071,495 B2
(45) Date of Patent: Sep. 11, 2018

(54) DEVICE AND METHOD FOR CUTTING PLASTIC MATERIAL, IN PARTICULAR A LAMINATED GLAZING ELEMENT

(71) Applicant: SAINT-GOBAIN GLASS FRANCE, Courbevoie (FR)

(72) Inventors: Erwan Baquet, Compiegne (FR); Fabien Levasseur, Marest sur Matz (FR); Christophe Milamon, Plessis de Roye (FR); Jean-Clément Nugue, Lamorlaye (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/414,268

(22) PCT Filed: Jul. 5, 2013

(86) PCT No.: PCT/FR2013/051600
§ 371 (c)(1),
(2) Date: Jan. 12, 2015

(87) PCT Pub. No.: WO2014/009638
PCT Pub. Date: Jan. 16, 2014

(65) Prior Publication Data
US 2015/0202787 A1    Jul. 23, 2015

(30) Foreign Application Priority Data

Jul. 11, 2012  (FR) ..................................... 12 56692

(51) Int. Cl.
*B26D 7/14*         (2006.01)
*B32B 17/10*        (2006.01)
(Continued)

(52) U.S. Cl.
CPC ............ *B26D 7/14* (2013.01); *B32B 17/1099* (2013.01); *B32B 17/10761* (2013.01);
(Continued)

(58) Field of Classification Search
CPC . B26D 1/06; B26D 1/065; B26D 1/09; B26D 1/10; B26D 7/14; Y10T 83/0474;
(Continued)

(56) References Cited

U.S. PATENT DOCUMENTS 1,469,245 A * 10/1923 Baxter ...................... C14B 5/00
                                                 144/197
2,776,710 A *  1/1957 Homery ................. B21D 21/00
                                                  83/368
(Continued)

FOREIGN PATENT DOCUMENTS

CH           677334  A5 *  5/1991  ............. B26D 1/085
EP         0548607  A1 *  6/1993  ............. B26D 7/086
(Continued)

OTHER PUBLICATIONS

English Translation of CH 677334.*
(Continued)

*Primary Examiner* — Jennifer Swinney
(74) *Attorney, Agent, or Firm* — Pillsbury Winthrop Shaw Pittman LLP

(57) ABSTRACT

A device for cutting a flexible material of plastic type, laminated between two substrates and overhanging the edges of the substrates, includes a cutting tool and a pulling tool arranged upstream of the cutting tool.

25 Claims, 2 Drawing Sheets

(51) Int. Cl.
   *B26D 1/02* (2006.01)
   *B26D 1/06* (2006.01)
   *B26D 1/10* (2006.01)
   *B26D 1/24* (2006.01)
   *B26D 5/00* (2006.01)
   *B26F 1/44* (2006.01)

(52) U.S. Cl.
   CPC ............... *B26D 1/02* (2013.01); *B26D 1/06* (2013.01); *B26D 1/10* (2013.01); *B26D 1/24* (2013.01); *B26D 5/007* (2013.01); *B26F 2001/4427* (2013.01); *B32B 2329/06* (2013.01); *Y10T 83/0424* (2015.04); *Y10T 83/323* (2015.04)

(58) Field of Classification Search
   CPC ............ Y10T 83/323; Y10T 83/0419; Y10T 83/0424; Y10T 83/0433
   USPC ........................... 83/157, 436.8, 436.9, 496
   See application file for complete search history.

(56) References Cited

U.S. PATENT DOCUMENTS

| | | | | |
|---|---|---|---|---|
| 3,140,633 | A * | 7/1964 | Vincent | D03D 47/00 139/435.5 |
| 3,572,075 | A * | 3/1971 | Sporck | B21B 19/12 72/86 |
| 3,738,403 | A * | 6/1973 | Schwoch | B23Q 3/002 144/250.15 |
| 4,014,233 | A * | 3/1977 | Wolfinger | B65H 35/06 83/156 |
| 2003/0010802 | A1* | 1/2003 | Blaimschein | B26D 7/025 225/96 |
| 2008/0264317 | A1* | 10/2008 | Dobrescu | B26D 1/24 112/122.3 |
| 2011/0284341 | A1* | 11/2011 | Saastamo | B65G 13/10 198/457.02 |

FOREIGN PATENT DOCUMENTS

| | | | |
|---|---|---|---|
| EP | 1 382 441 A1 | 1/2004 | |
| EP | 2 087 971 A2 | 8/2009 | |
| EP | 2 174 784 A1 | 4/2010 | |
| EP | 2 177 329 A1 | 4/2010 | |
| GB | 2221181 A * | 1/1990 | ............... B26D 5/30 |

OTHER PUBLICATIONS

International Search Report issued in International Patent Application No. PCT/FR2013/051600, dated Nov. 29, 2013.

Written Opinion of the International Searching Authority issued in International Patent Application No. PCT/FR2013/051600, dated Nov. 29, 2013.

* cited by examiner

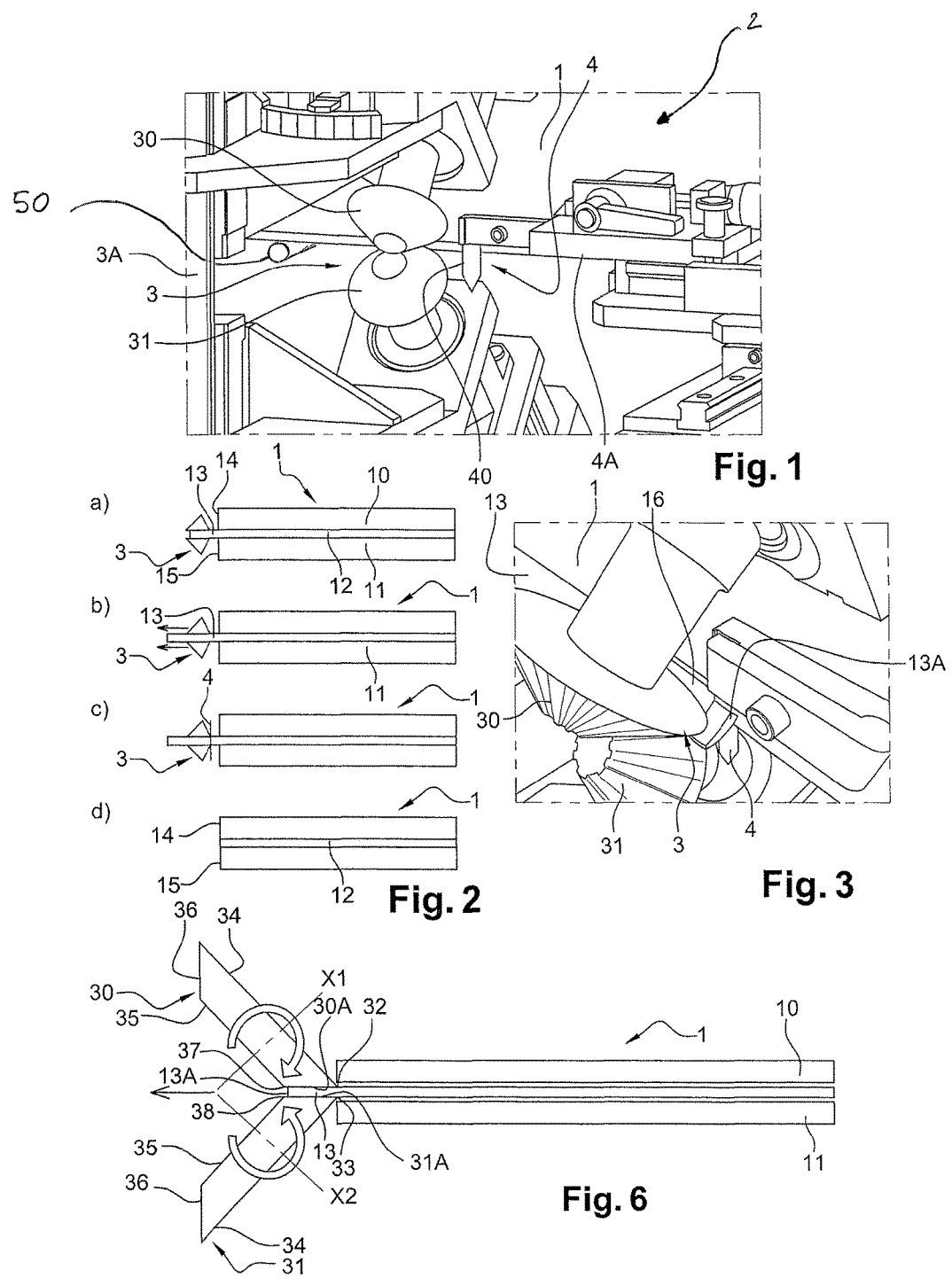

DEVICE AND METHOD FOR CUTTING PLASTIC MATERIAL, IN PARTICULAR A LAMINATED GLAZING ELEMENT

CROSS-REFERENCE TO RELATED APPLICATIONS

This application is the U.S. National Stage of PCT/FR2013/051600, filed Jul. 5, 2013, which in turn claims priority to French Application No. 1256692, filed Jul. 11, 2012. The contents of all of these applications are incorporated herein by reference in their entirety.

The invention relates to a device and to a process for cutting a flexible material of plastic type, laminated between two substrates, the cutting being carried out on the overhanging portion of the material at the edge of the laminate after assembling the substrates.

The invention will be more particularly described with respect to glazing made of laminated glass, without however being limited thereto.

Laminated glazing comprises at least two substrates, placed between which is at least one interlayer sheet or film made of plastic, for example made of polyvinyl butyral (PVB). After assembling the laminate, the PVB overhangs the perimeter of the glazing by a width generally of between 5 and 40 mm. It is necessary to trim the overhang of plastic before the known degassing and autoclaving steps, the latter requiring the glazing to be introduced into a heated chamber.

Currently, the trimming step is carried out either manually using cutting means of utility knife type that are slid along the edge of the glazing, or in an automated manner by cutting means of the type of blades or saws fastened to moving (or fixed) heads that are moved in translation following the edge of the glazing (or along which the glass is conveyed).

However, the cutting remains tricky and it sometimes happens that while shaving the edge of the glass with the cutting tool, this leads to splinters (flakes of a few tenths of millimeters) that inadvertently constitute fracture initiators of the glass during the conversion, or else problems of quality after manufacture. The glazing is then scrapped. In addition, this contact of the blade of the cutting tool with the glass leads to premature wear of the blade, or even the breaking thereof.

Furthermore, an automated system is known from patent application EP 2 087 971, the cutting means of which provide an oscillating back and forth movement perpendicular to the edges of the substrates.

The objective of the invention is therefore to propose a device and a process for cutting a flexible material sandwiched between two, rigid substrates and projecting beyond the edges of said substrates, which provides an alternative solution to the prior art without exhibiting the aforementioned drawbacks.

According to the invention, the device for cutting a flexible and elastic material, of plastic type, laminated between two substrates and overhanging the edges of the substrates, comprising cutting means, is characterized in that it additionally comprises pulling means arranged upstream of the cutting means.

The term "upstream" describes the components of the device that are placed before other components, the latter being on the other hand described as "downstream", the upstream components being used in the cutting process prior to the other components that follow thereafter downstream.

The purpose of the pulling means is to pull, prior to the cutting, on the flexible overhanging portion, in order to keep it flat and taut so as to ensure a clean and close cut, at the appropriate distance from the edges of the substrates.

The device thus advantageously uses the elastic property of the material to be cut. By pulling on the material, this material being in a taut state, it may be cut at a distance from the glass and is easily and efficiently cut. Then, by releasing the tension, said material retracts. By having optimized the cutting distance of the material in the taut state from the edges of the substrates, the material once retracted becomes coplanar or substantially coplanar with the edges of the glass substrates, that is to say that it no longer overhangs.

The stretching is localized and temporary for the time just preceding the cutting and for the time of the cutting, since at the moment of the cutting, the pulling means that precede the cutting means are already in the process of stretching a region adjacent to and downstream of the region being cut. Consequently, since the pulling means no longer act on the remaining part of cut material associated with the laminated film, this material, being elastic, retracts naturally without requiring specific means.

It should be noted that the interlayer material may itself be laminated and composed, for example, of several sheets of plastic. These sheets in the overhanging portion remain sufficiently joined so that the outer faces of the outer sheets of the interlayer are grabbed by the pulling means, enabling the stretching of all of the sheets.

According to one feature, the pulling means comprise at least two rotating parts that rotate about respective axes of rotation and that are suitable for clamping the overhanging portion of material along two opposite faces of said portion, and for pivoting over these faces during the rotational movement thereof.

Preferably, each part is arranged so that its axis of rotation firstly forms an angle of inclination a with a plane that is perpendicular to the edges of the substrates and downstream of the part, said angle being greater than 0° and less than or equal to 75°, preferably at most 30°, in particular of the order of 10° and secondly is divergent with respect to the direction of arrival of the cutting means. Thus, firm gripping of the material is ensured and effective stretching without wrinkling is guaranteed, by minimizing the necessary size of overhang of the material in order to carry out the stretching.

Advantageously, each rotating part has a conical or frustoconical body, the lateral surface of which, forming the generatrices of the cone or of the conical frustum, is intended to form a partial contact area with one of the faces of the overhanging portion, the contact areas being parallel and spaced apart.

The rotating parts, in particular the contact areas thereof with the material, are spaced apart from one another, especially by a distance $d_5$ that is adjusted as a function of the thickness of the overhanging portion, of the type of material to be cut, of the ambient temperature and of the weight of the upper substrate pressing on the laminated material, preferably the distance $d_5$ being between 0.05 and 2 mm.

According to another feature, the rotating parts rotate in opposite directions, and in the direction of the overhanging portion.

According to yet another feature, the axes of rotation of the rotating parts are inclined with respect to a horizontal plane or general plane of the substrates, by an angle preferably of 45°.

As regards the cutting means, they are intended to be arranged at a distance from the edges of the substrates, in accordance with a value $d_1$ in a direction transverse to said edges of the substrates of the order of 2.5 mm, in particular 1.5 mm. By optimizing the distance separating the glass from the cutting means, it is guaranteed that the cutting means cannot touch the glass during the cutting operation, and the remaining part of the material after stretching and cutting is thus intended to retract naturally level with the edges of the substrates without protruding.

Furthermore, the end of the pulling means which is intended to be the closest to the substrates is separated from the edges of said substrates along a direction transverse to the latter by a distance d2 of between 1.5 and 5 mm, preferably of the order of 3.5 mm.

Advantageously, the pulling means are offset with respect to the cutting means, in a direction transverse to the cutting, by a distance d3 in particular of the order of 1 mm.

In addition, the pulling means are at a distance from the cutting means, in the cutting direction, having a value d4 of between 5 and 15 mm in particular, preferably of the order of 10 mm.

In one preferred embodiment, the surface of the pulling means intended to be in contact with the overhanging portion is ribbed or grooved or comprises roughnesses or protruding shapes.

According to one advantageous feature, the movement of the cutting means is controlled by that of the pulling means.

The invention also relates to an automated process for cutting a flexible material of plastic type, laminated between two substrates and overhanging the edges of the substrates, in particular for cutting plastic material that overhangs laminated glazing, characterized in that it comprises, before cutting, a step of localized stretching/elongation of the material.

The expression "automated process" is understood to mean a process that requires automated tools, unlike a manual process.

Advantageously, the process uses pulling means comprising at least two rotating parts arranged in contact and on either side of the overhanging portion, and a rotational movement in the opposite direction is applied to the parts, so as to locally clamp the overhanging portion and stretch it substantially transversely to the edges of the substrates, a translational movement being, in combination, imposed on the glazing or on the pulling means.

The cutting speed is controlled as a function of the rotational speed of the parts of the pulling means.

In one preferred embodiment, the rotational speed of the parts of the pulling means is modified during the cutting along one side of the substrate between two opposite corners of the substrate, preferably in accordance with three successive phases that have a first speed V1 on starting up, a second intermediate speed V2, and a third speed V3 on finishing the portion to be cut, and preferably such that V1>V2>V3.

In the remainder of the description, the qualifiers "upper" and "lower" of a component are used within the context of a normal installation of the device, that is to say relative to a vertical concept with respect to a flat horizontal surface on which the glazing would be laid by one of its general faces.

The present invention is now described using examples, which are merely illustrative and in no way limit the scope of the invention, together with the appended illustrations, in which:

FIG. 1 represents a rear perspective view of the device, the glazing being arranged at the front of the device;

FIG. 2 schematically illustrates, in side view, the steps of the cutting process of the invention;

FIG. 3 illustrates a detailed view, in downward perspective, of the device during the stretching and cutting steps;

FIG. 6 is a schematic cross-sectional side view of the pulling means that cooperate with the overhanging portion of the glazing;

Figures 4, 5:
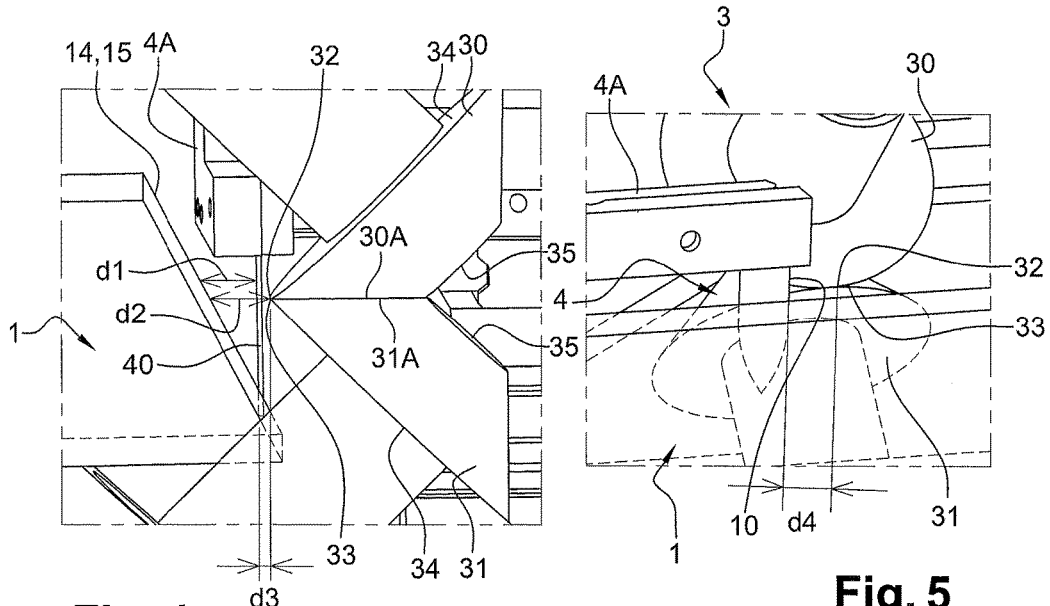
FIG. 4 is a schematic detailed perspective side view of the device and that shows glazing without an overhanging portion of plastic film.
FIG. 5 is a detailed perspective front view of the device partly visible via transparency through glazing.

The invention relates to a device for cutting and to a process for cutting, using this device, a flexible material, in particular of polymer type, laminated between two rigid substrates and overhanging beyond the edges of the substrates, at least along one of the sides.

Without being limited thereto, the invention is described with regard to laminated glazing 1, seen schematically in FIGS. 1 to 6, comprising, with regard to FIG. 6, two glass substrates 10 and 11 and a flexible interlayer film 12 for example made of a polymer material of PVB type, a portion 13 of the film sticking out from the edges 14 and 15 of the substrates by a width for example of between 5 and 20 mm. The overhanging portion 13 extends over at least one entire side of the glazing, generally along four sides.

The cutting device 2 of the invention, partially visible in FIG. 1, comprises support means (not visible here) for the glazing 1, means 3 for pulling the overhanging portion 13 of the interlayer film and means 4 for cutting said overhanging portion.

According to invention, the cutting process illustrated schematically in FIG. 2 comprises the following steps:

a) positioning of the pulling means, b) pulling of the overhanging portion 13 or stretching of said portion via the pulling means 3, c) cutting by the cutting means 4 in order to obtain the result visible in step d) showing the removal of the overhanging portion, the interlayer film 12 being flush with the edges 14 and 15 of the substrates.

More particularly, the process and the device of the invention create, as illustrated in FIG. 3, a pull on the overhanging portion 13 while being located at a zone 16 in order to stretch and extend the latter and cut it almost immediately.

The pulling means 3 are arranged upstream of the cutting means 4, the stretching of the overhanging portion of the film taking place before the cutting.

With regard to FIGS. 4 and 5, the pulling means 3 and the cutting means 4 are borne respectively by automated systems 3A and 4A, and are electronically controlled, for example by a programmable controller.

The cutting means 4 are arranged at a distance from the edges of the substrates.

They are implemented so as to produce a cut that extends parallel to the side of the glazing (to the edges of the substrates) from one of the corners of the glazing to the opposite corner.

In order to ensure the pulling and cutting over the whole of one side of the glazing, either the glazing is moved in translation whilst the pulling means 3 and cutting means 4 are fixed with respect to the side of the glazing, or the glazing is fixed and the pulling means 3 and cutting means 4 are moved in translation along the side of the glazing with the same translational speed, preferably while being associated with a single frame.

On a glazing production line, the glazing is moved in translation on a conveyor 50 in a longitudinal direction. The device of the invention then comprises the following components:

- arranged respectively on either side of the two longitudinal sides of the conveyor (direction of travel of the glazing) is a pair of pulling means and cutting means, each pair being fixed; and
- arranged at least on one of the sides transverse to the longitudinal sides is a pair of pulling means and cutting means that are moved in translation along this side.

The cutting means 4 consist of any means known to a person skilled in the art.

The cutting means 4 comprise for example a knife, the cutting blade 40 of which is capable of cutting the film by a translational movement in a single direction, in the direction of the material not yet cut. The blade could as a variant carry out a back-and-forth movement.

The blade may be simple or profiled, which increases the efficiency of the cutting operation.

In another variant, the cutting means are formed from shear disks.

The rate of travel of the cutting means, in particular using a blade, may especially reach 1000 mm/s.

As can be seen in FIG. 4, the cutting means 4 are arranged at a distance from the edge of the glazing (from the edges of the substrate), this separation distance d1 between the blade and the edges of the substrates, in a direction transverse to said edges of the substrates, is for example 1.5 mm when a material stretching of 2 mm is obtained.

This separation distance d1 between the blade and the edges of the substrates is in particular a function of the magnitude of the stretching that can be obtained, of the material to be cut and of the retraction of said material after stretching and cutting.

In addition, due sometimes to the existence of glass tips projecting from the edges of the substrates, it is preferred to arrange the blade at 2 mm at least from the edge.

The distance d1 may vary during the process, in particular in order to move away from the edges the substrates if a glass lip is detected. Advantageously, a system for continuously monitoring the profile of the edge of the substrates makes it possible to bring the blade as close as possible to the glass without risk of contact, while ensuring in the event that a glass lip is detected, an appropriate distancing of the blade from the edge of the substrates, just before the blade arrives opposite the lip. After passing the lip, the blade can again be brought closer to the substrates.

Since the cutting means are furthermore automated, it is possible to vary the distance in response to a detection of defects over the edges of the glass in order to prevent any contact/impact of the blade with these defects.

The pulling means 3 of the invention, as illustrated in particular in FIGS. 1, 3, 4 and 6, comprise at least two rotating parts 30 and 31 arranged opposite and at a distance from one another, and at a distance from the edge of the glazing.

The parts 30 and 31 are close enough to one another to be capable of clamping the overhanging portion 13 (FIGS. 3 and 6), one of the parts 30 having a contact surface 30A which bears against one of the faces 13A of said overhanging portion, whilst the other part 31 has a contact surface 31A which is applied against the opposite face 13B of said overhanging portion.

The separation distance of the rotating parts corresponds to the spacing distance d5 of the two respective contact surfaces 30A and 31A (FIG. 7), which will be described in detail further on.

The rotating parts 30 and 31, by being arranged at a distance from the edges 14 and 15 of the substrates and on either side of the outer faces 13A and 13B of the overhanging portion 13, are capable, by their geometrical arrangement and their rotation, of locally stretching (with respect to the length of the overhanging portion along the side of the glazing) said overhanging portion in a zone 16 (visible in FIG. 3) wedged between said contact surfaces 30A and 31A of the parts.

Figures 7, 8:
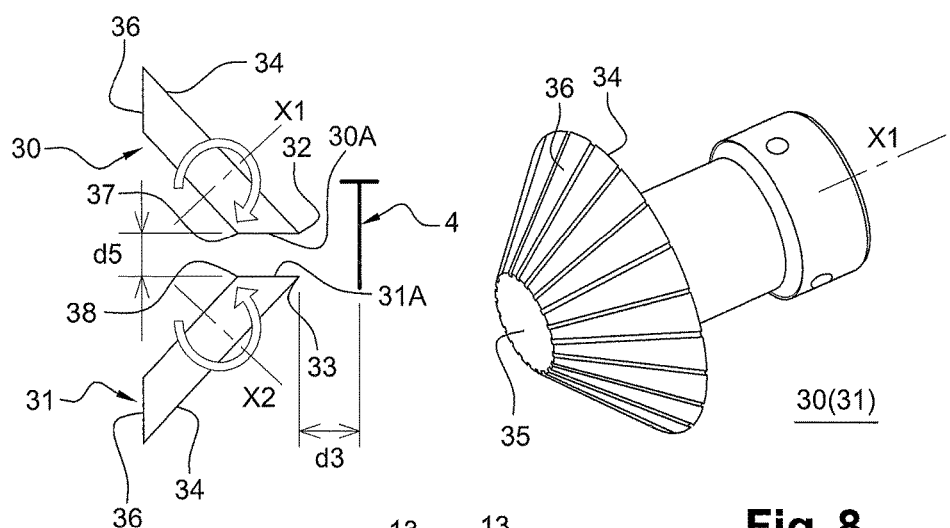
FIG. 7 is a schematic cross-sectional side view of the pulling means and of the cutting means.
FIG. 8 is a perspective view of an example of a rotating part of the pulling means.

With regard to FIGS. 4, 6 and 7, the end of the pulling means 3 which is closest to the glazing, namely the respective distal ends 32 and 33 of the parts 30 and 31 facing the substrates and referred to as front ends, is spaced apart from the edges of the substrates, along a direction transverse to the latter, by a distance d2, which is for example of the order of 3.5 mm. Preferably, this distance d2 is between 1.5 and 5 mm.

Furthermore, the cutting means 4 are extremely close to the pulling means 3, as can be seen in FIGS. 3 to 5.

More particularly (FIGS. 3 and 7), in a direction transverse to the edges of the substrates, the front end 32, 33 of the pulling means 3 is offset with respect to the blade 40 by a value d3 of the order of 1 mm. The cutting means 4 nevertheless inevitably remain arranged, in a direction transverse to the glazing, between said glazing and the pulling means 3.

In the direction longitudinal to the side of the glazing (FIG. 4), along the cutting direction, the pulling means 3 are separated from the cutting means 4 by a distance having a value d4 preferably of between 5 and 15 mm, preferably of the order of 10 mm. The almost immediate cutting of the material can thus be carried out in the stretched zone 16 (FIG. 3).

Advantageously according to the invention, with regard to FIGS. 3 and 6 to 8, each rotating part 30, 31 has a conical or frustoconical body capable of rotating about its fastening axis and rotational axis X1, respectively X2.

As a variant, the bodies may be cylindrical. Nevertheless, the frustoconical shape of the parts makes it possible to move them forward as close as possible to the glazing.

The frustoconical body of each part shows, seen in cross section in a plane containing the axis of rotation, the shape of a trapezium with one large base 34, one small opposite base 35 and generatrices that join the two bases in order to form the conical or or conical frustum lateral surface 36. On rotating the part 30, 31, the lateral surface 36 is intended to be in partial contact along the surface 30A, respectively 31A, with the localized zone 16 of the overhanging portion 13.

With regard to FIGS. 6 and 7, the parts 30 and 31 are arranged with respect to the horizontal general plane of the glazing so that the rotational axes X1 and X2 form an angle of between 0° and 70°, preferably equal to 45°.

Furthermore, they are positioned opposite so that the surfaces 30A and 31A intended to be in contact with the outer faces 13A and 13B of the overhanging portion of the film are parallel and separated by the distance d5 (FIG. 7) already mentioned above. This distance is adjusted in order to trap the material of the overhanging portion 13.

The spacing distance d5 of the two respective contact surfaces 30A and 31A is adjusted as a function of the thickness of the overhanging portion, of the type of material to be cut (the elasticity of the material being different depending on its composition) and of the ambient temperature, the polymer material being deformed as a function of the temperature, and also of the weight of the upper substrate 10 pressing on the film 11.

The spacing distance d5 between the two contact surfaces 30A and 31A is especially between 0.03 mm and 1.3 mm for temperatures considered between 16° C. and 22° C. and thicknesses of PVB, in particular standard PVB, between 0.38 and 1.52 mm.

By way of example, the spacing distance is 0.05 mm for standard PVB having a thickness of 0.38 mm, at an ambient temperature of 20° C. during the implementation of the cutting process; it is 0.4 mm for standard 0.76 mm PVB at 20° C.

In order to ensure the clamping and stretching of the overhanging portion, a rotational movement in the opposite direction is imposed on each of the parts 30 and 31, the direction of rotation of one of the parts being directed toward the other opposite part. Thus, the direction of rotation of each of the parts is respectively directed toward each of the faces 13A, 13B of the overhanging portion 13 of the film.

Figure 9:
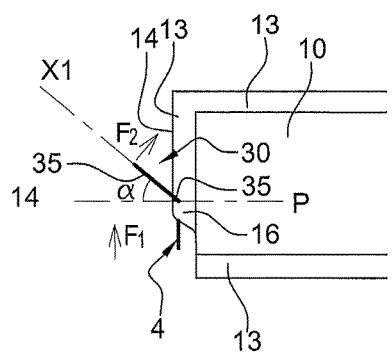
FIG. 9 is a schematic top view of a preferred variant of the positioning of the pulling means.

Moreover, in a preferred manner according to the invention, the pulling is ensured and optimized by the geometrical arrangement of the rotating parts with respect to the perpendicular line at 90° to the edges of the substrates. In particular, as illustrated in the schematic FIG. 9 as a top view of the glazing and of the device during cutting (only the part 30 is visible here), each part 30, 31 is arranged in a preferred manner so that its axis of rotation X1, X2 on the one hand forms an is angle α with a plane P that is perpendicular to the edges 14, 15 of the substrates and to the horizontal general plane of the glazing, and considered downstream of the part, and on the other hand is divergent with respect to the direction of travel according to the arrow F1 of the cutting means 4.

Each part is inclined so that its rear end 34 is positioned on the opposite side from the cutting means 4, the rear end 34 being further away than the front end 35, making it possible to clear the space on the side of the arrival of the cutting means. Moreover, the inclination favors a stretching toward the opposite side (arrow F2) of the cutting means, completely stretching the zone 16 of the material in order to immediately carry out the cutting thereof.

The parts 30 and 31, due to their axis of rotation, are not therefore strictly perpendicular to the edges of the substrates. The angle α is greater than 0° and less than or equal to 75°, preferably at most 30°, in particular of the order of 10°.

This angle α constitutes an "angle of attack" that generates, with the rotation of the parts, a pulling force that makes it possible to minimize the gripping surface necessary for the elongation of the elastic material and that guarantees effective stretching without wrinkling.

Furthermore, the frustoconical shape of the parts generates, for each of them, a distinct speed at, on the one hand, their front end 32, respectively 33, corresponding to the large base 34, and, on the other hand, their rear end 37, respectively 38, corresponding to its small base 35. This difference in speed advantageously leads to better pulling in the cutting zone.

The pincer clamping of the overhanging portion 13 by the two rotating parts 30 and 31, combined with the speed asymmetry between the two front and rear ends of the body of each of the parts generates a clamping and localized stretching in a direction opposite to the glazing (to the substrates), with a force that the material is subjected to distributed over the entire contact surface 30A and 31A of the rotating parts.

In combination with the rotation of the parts 30 and 31, a translational movement is imposed along the overhanging portion 13 either by translation of the pulling means, or by translation of the glazing, which leads to the stretching of the material in the direction of separation from the glazing following in parallel the side of the glazing. As this stretching and the translational movement take place, the cutting is carried out also following the same translational movement.

By way of example, the rotational speed of the parts is of the order of 330 rpm whilst the translational speed is of the order of 600 mm/s. The translational speed is adjusted to the rotational speed; in particular by reducing the rotational speed, the translational speed will be reduced.

Finally, advantageously the lateral surfaces 36 of the parts may be ribbed, grooved or comprise spikes in order to optimize the gripping of the metal rotating parts onto the plastic material.

The cutting process is now described.

The glazing 1 is supported horizontally by means that are known per se.

The pulling means 3 are started up upstream of one corner of the glazing parallel to the side to be cut and in the immediate vicinity of the overhanging portion of the film, of a few millimeters, or even more, so that the parts reach their nominal speed. The separation space between the two parts is located in a coplanar manner with the polymer interlayer.

The parts 30 and 31 rotate, while being moved translationally or else while remaining fixed with respect to the glazing, the glazing then being moved translationally. Advancing in the direction of the overhanging portion, the parts grab the latter when they come into contact on either side of each of the faces 13A, 13B of said portion.

Stretching takes place. Due to the concomitant translational movement of the cutting means 4, the latter come back into contact with the stretched zone 16 in order to cut it.

The translational movement of the rotating parts and of the cutting means is continued along the whole of the side up to the opposite corner of the glazing.

If the side of the glazing transverse to the last corner cut must also be trimmed, all of the automated systems 3A and 4A are moved in order to be placed facing the new side to be cut.

Regarding the rotational and translational speeds of the parts and translational speeds of the cutting means, these speeds are optimized as a function of the material to be cut, of the temperature of the material and of its thickness, and of the cutting sites over one entire side.

In particular, the rotational speed of each of the parts (the speed being the same for each part) of the pulling means may be modified during the cutting along one side of the substrate between two opposite corners of the substrate, for example and preferably in accordance with three successive phases that have a first speed V1 on starting up, a second intermediate speed V2, and a third speed V3 on finishing the portion to be cut, and such that V1>V2>V3.

The invention claimed is:

1. A device for cutting a flexible material, laminated between two substrates and overhanging edges of the two substrates, the two substrates with the laminated flexible material forming a laminated glazing, the device comprising:

a cutting tool constructed and arranged to cut an overhanging portion of the flexible material;

a pulling tool constructed and arranged to pull only the overhanging portion of the flexible material, and a conveyor constructed and arranged to provide a relative movement between the laminated glazing on one hand and the cutting and pulling tools on the other hand, wherein the pulling tool is arranged upstream of the cutting tool such that, during the relative movement by the conveyor, the pulling tool pulls on at least part of the overhanging portion in a direction substantially transverse to the edges of the two substrates before the cutting tool cuts said at least part of the overhanging portion so that said at least part of the overhanging portion is in a stretched state when the cutting tool cuts said at least part of the overhanging portion.

2. The device as claimed in claim 1, wherein the pulling tool comprises at least two rotating parts that, in use, rotate about respective non-parallel axes of rotation and that are arranged to clamp the overhanging portion of material along two opposite faces of said overhanging portion, and arranged to rotate over said two opposite faces during the rotational movement thereof.

3. The device as claimed in claim 2, wherein each rotating part of the at least two rotating parts is arranged so that each respective axis of rotation thereof firstly forms an angle of inclination a with a plane that is perpendicular to the edges of the two substrates and downstream of the rotating part, said angle being greater than 0° and less than or equal to 75° and secondly is divergent with respect to a direction of arrival of the cutting tool.

4. The device as claimed in claim 3, wherein said angle is at most 30°.

5. The device as claimed in claim 4, wherein said angle is of the order of 10°.

6. The device as claimed in claim 2, wherein each of the at least two rotating parts has a conical or frustoconical body, a lateral surface of which, forming the generatrices of a cone or of a conical frustum, to form a partial contact area with one of the faces of the overhanging portion, the contact areas being parallel and spaced apart.

7. The device as claimed in claim 6, wherein the contact areas are spaced apart from one another by a distance that is adjusted as a function of a thickness of the overhanging portion, of the type of material to be cut, of the ambient temperature and of the weight of an upper substrate pressing on the laminated material.

8. The device as claimed in claim 2, wherein the at least two rotating parts, are spaced apart from one another, by a distance that is set based on a thickness of the overhanging portion, of the type of material to be cut, of the ambient temperature and of the weight of an upper substrate pressing on the laminated material.

9. The device as claimed in claim 8, wherein the distance is between 0.05 and 2 mm.

10. The device as claimed in claim 2, wherein the at least two rotating parts rotate in opposite directions, and in a direction of the overhanging portion.

11. The device as claimed in claim 2, wherein the axes of rotation of the at least two rotating parts are inclined with respect to a horizontal plane or general plane of the substrates, by an angle of 45°.

12. The device as claimed in claim 2, wherein at least part of the two rotating parts that clamps the overhanging portion is positioned to face the edges of the two substrates during the relative movement.

13. The device as claimed in claim 12, wherein the cutting tool includes a cutting element for cutting the overhanging portion, and wherein the at least part of the two rotating parts that clamps the overhanging portion is positioned farther away from the edges of the two substrates than the cutting element during the relative movement.

14. The device as claimed in claim 1, wherein the cutting tool is arranged at a distance from the edges of the substrates, in accordance with a value, in a direction transverse to said edges of the substrates, of the order of 2.5 mm.

15. The device as claimed in claim 14, wherein the value is of the order of 1.5 mm.

16. The device as claimed in claim 1, wherein an end of the pulling tool which is intended to be the closest to the two substrates is separated from the edges of said two substrates along a direction transverse to the latter by a distance of between 1.5 and 5 mm.

17. The device as claimed in claim 16, wherein the distance is of the order of 3.5 mm.

18. The device as claimed in claim 1, wherein the pulling tool is offset with respect to the cutting tool, in a direction transverse to the cutting, by a distance of the order of 1 mm.

19. The device as claimed in claim 1, wherein the pulling tool is separated from the cutting tool, in the cutting direction, by a distance having a value of between 5 and 15 mm.

20. The device as claimed in claim 19, wherein the distance is of the order of 10 mm.

21. The device as claimed in claim 1, wherein a surface of the pulling tool intended to be in contact with the overhanging portion is ribbed or grooved or comprises roughnesses or protruding shapes.

22. The device as claimed in claim 1, wherein a movement of the cutting tool is dependent from that of the pulling tool.

23. The device as claimed in claim 1, wherein the flexible material is plastic.

24. The device as claimed in claim 1, wherein the conveyor is constructed and arranged to move the laminated glazing relative to the pulling and cutting tools.

25. The device as claimed in claim 1, wherein the conveyor is constructed and arranged to move the pulling and cutting tools relative to the laminated glazing.

* * * * *